United States Patent
Mathews et al.

(10) Patent No.: US 7,349,336 B2
(45) Date of Patent: Mar. 25, 2008

(54) RANDOM EARLY DROP WITH PER HOP BEHAVIOR BIASING

(75) Inventors: Gregory Mathews, Santa Clara, CA (US); James Bauman, Los Gatos, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 980 days.

(21) Appl. No.: 10/370,670

(22) Filed: Feb. 18, 2003

(65) Prior Publication Data

US 2003/0223362 A1 Dec. 4, 2003

Related U.S. Application Data

(60) Provisional application No. 60/385,924, filed on Jun. 4, 2002.

(51) Int. Cl.
*H04J 1/16* (2006.01)
*H04L 12/28* (2006.01)

(52) U.S. Cl. .................. 370/230; 370/235; 370/252; 370/412

(58) Field of Classification Search ............... None
See application file for complete search history.

(56) References Cited

U.S. PATENT DOCUMENTS

| | | | |
|---|---|---|---|
| 6,134,239 A | 10/2000 | Heinanen et al. | |
| 6,515,963 B1 | 2/2003 | Bechtolsheim et al. | |
| 6,556,578 B1 | 4/2003 | Silberschatz et al. | |
| 6,865,185 B1* | 3/2005 | Patel et al. | 370/412 |
| 7,006,437 B2* | 2/2006 | Ogier et al. | 370/230.1 |
| 7,139,281 B1* | 11/2006 | Bodin | 370/412 |
| 2002/0107908 A1* | 8/2002 | Dharanikota | 709/203 |
| 2003/0086413 A1* | 5/2003 | Tartarelli et al. | 370/352 |
| 2003/0152076 A1* | 8/2003 | Lee et al. | 370/389 |
| 2003/0152084 A1* | 8/2003 | Lee et al. | 370/395.21 |

OTHER PUBLICATIONS

Floyd et al., "Random Early Detection Gateways for Congestion Avoidance", vol. 1, No. 4, (Aug. 1993), IEEE\ACM Transactions on Networking.

Nichols et al., Definition of the Differentiated Services Field (DS Field) in the IPv4 and IPv6 Headers, Network Working Group, RFC 2474, Dec. 1998.

Blake et al., An Architecture for Differentiated Services, Network Working Group, RFC 2475, Dec. 1998.

Heinanen et al., Assured Forwarding PHB Group, Network Working Group, RFC 2597, Jun. 1999.

* cited by examiner

*Primary Examiner*—Andrew C. Lee (57) ABSTRACT

A technique for random early drop (RED) with per-hop-behavior (PHB) biasing involves breaking RED parameters into queue-specific parameters and packet-specific parameters. Each queue has associated queue-specific parameters. Each packet has an associated traffic class. The packet-specific parameters are related to the traffic class of the packet. The queue-specific and packet-specific parameters are then both used in RED procedures, thereby providing a PHB bias from using packet-specific parameters. The technique provides for absolute queue size support that can be dynamically changed based upon available memory resource levels.

20 Claims, 7 Drawing Sheets

RANDOM EARLY DROP WITH PER HOP BEHAVIOR BIASING

CROSS REFERENCE TO RELATED APPLICATION

This application is entitled to the benefit of provisional Patent Application Ser. No. 60/385,924, filed Jun. 4, 2002.

FIELD OF THE INVENTION

The present invention relates generally to congestion avoidance in a packet-switched network, and more particularly to congestion avoidance techniques that utilize random early drop (RED).

BACKGROUND OF THE INVENTION

Packet-switched networks are responsible for forwarding packet-based traffic. When a large amount of traffic is forwarded through the network, the network can become congested. When a network is congested, queues within the network have a relatively large number of packets enqueued in them. If the congestion is not alleviated, the queues fill up and subsequent incoming packets must be dropped. This typically results in a high proportion of packets from the same source being dropped. Also, the congestion itself can slow the network down. There are a number of techniques to avoid network congestion. One such technique is random early drop (RED). RED gateways are designed to accompany a transport-layer congestion control protocol such as transmission control protocol (TCP). RED logic within the RED gateways is typically designed to provide congestion avoidance by controlling average queue size, but may also be designed to avoid global synchronization, avoid a bias against bursty traffic, and maintain an upper bound on the average queue size. RED logic reacts to incipient congestion either by dropping packets that are arriving at a queue or by setting a bit in packet headers. The RED logic helps keep the average queue size manageable, which keeps average delay in the network manageable, while allowing occasional bursts of packets in the queue so as to avoid a bias against bursty traffic.

A RED algorithm calculates average queue size using a low-pass filter with an exponential weighted moving average. The average queue size is compared to two thresholds, a minimum threshold and a maximum threshold. When the average queue size is less than the minimum threshold, no packets are marked. When the average queue size is greater than the maximum queue size, every packet is marked. If marked packets are dropped, the average queue size should not significantly exceed the maximum threshold. When the average queue size is between the minimum threshold and the maximum threshold, arriving packets are marked with a probability that is a function of the average queue size. Thus, the RED algorithm actually consists of two algorithms, a first for computing the average queue size determines the degree of burstiness that will be allowed, and a second for calculating packet-marking probability determines how frequently the gateway marks packets for a given level of congestion. The goal is to mark packets at fairly evenly-spaced intervals, in order to avoid biases and to avoid global synchronization, and to mark packets sufficiently frequently to control the average queue size.

Figure 1A:
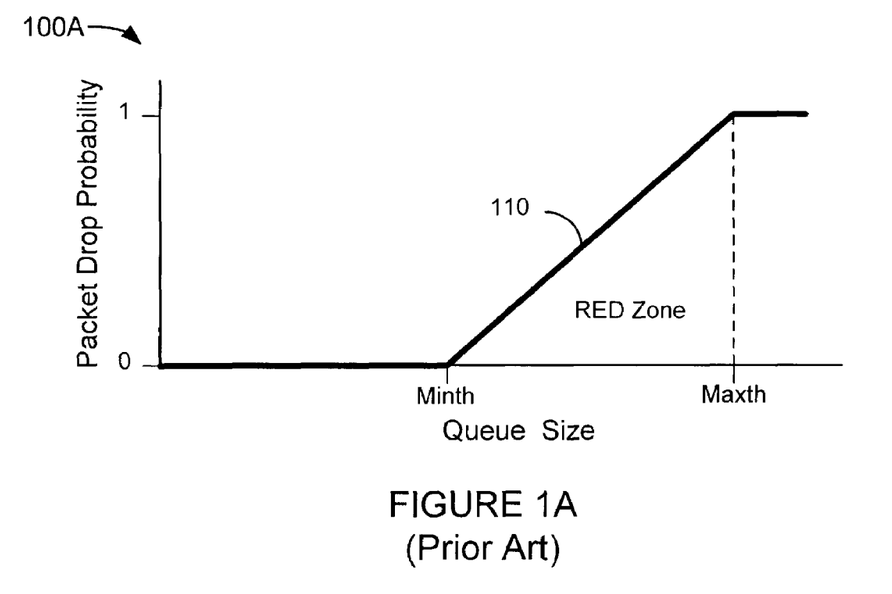
FIGS. 1A and 1B demonstrate the treatment of packets in accordance with random early drop (RED).
Figure 1B:
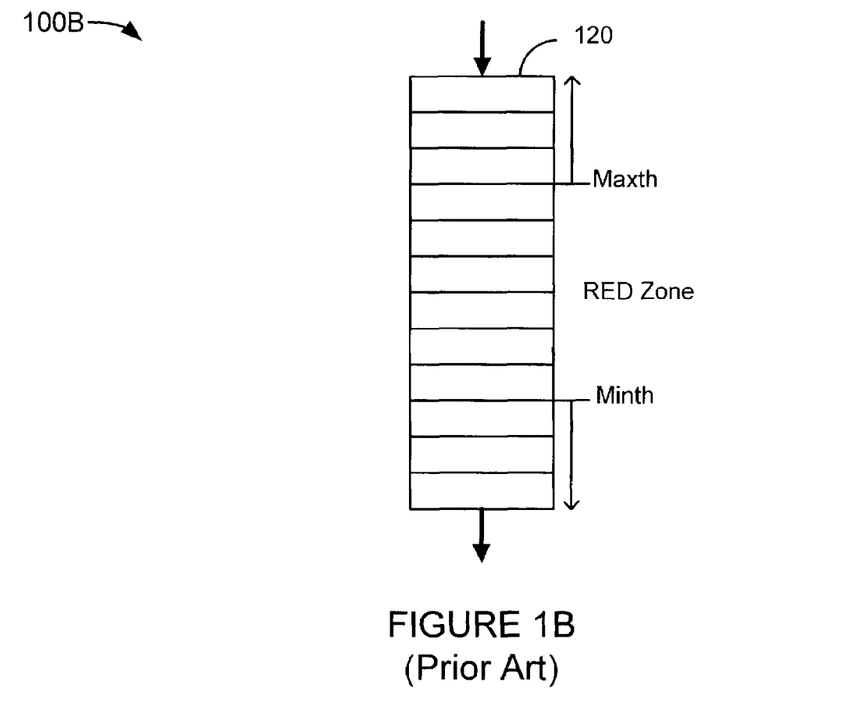

FIGS. 1A and 1B demonstrate the treatment of packets in accordance with a RED algorithm. In graph 100A, packets are dropped with a probability that is based upon which of three zones a packet is in. The first zone is below a minimum threshold, minth; the second zone is above a maximum threshold, maxth; and the third zone is between minth and maxth, in what is sometimes referred to as the RED zone. The plot 110 illustrates the likelihood of a drop for a packet in any of the three zones. In the first zone, a packet has a 0 probability of being dropped. In the second zone, the probability is 1 (i.e., all packets are dropped). In the third zone, packets have a probability that is a function of the average size of the queue. The system 100B illustrates the three zones with respect to a queue 104. The queue 104 is divided into three zones comparable to the three zones of the graph 100A.

Formula 1, below, is a typical algorithm for calculating the average queue size. Formulae (2a), (2b), and (2c) are, together, a typical algorithm for calculating the probability of drop for a packet. The formulae are as follows:

$$\text{avg} \leftarrow \text{avg} + (\text{qsize} - \text{avg}) * wq \quad (1)$$

$$A = \text{maxp}(\text{avg} - \text{minth})/(\text{maxth} - \text{minth}) \quad (2a)$$

$$B = A(\text{Packet Size}/\text{Max Packet Size}) \quad (2b)$$

$$\text{Probability of Drop} = B/(1 - (\text{Count} * B)) \quad (2c)$$

where:
avg=average queue size,
qsize=the real queue size,
wq=the weight of the queue,
minth=minimum queue size threshold,
maxth=maximum queue size threshold,
maxp=packet marking probability, and
Count=number of accepted cells since last drop.

The variables of the formulae are absolute numbers in that they do not vary with packet-based parameters. However, it may be desirable to afford different treatment for certain packets, such as those having an assured forwarding (AF) class, which is a differentiated service (DS) per-hop-behavior (PHB) group. For further information on the AF PHB group, see Heinanen, Request for Comments (RFC) 2597, June 1999, which is incorporated herein by reference as background. Nichols et al., RFC 2474, December 1998, incorporated herein by reference as background, defines the DS Internet protocol (IP) header field, and Blake et al., RFC 2475, December 1998, incorporated herein by reference as background, defines a DS architecture. The standard RED algorithm does not differentiate between packets with different traffic classes. However, there is a need for IP packets to be assigned different drop precedence based on traffic class. Accordingly, there is a need for a modified RED algorithm that differentiates between packets of differing traffic classes. The algorithm should be implementable in a high-speed switched network in accordance with AF PHB group requirements.

In view of the desire to provide PHB bias to a RED algorithm, what is needed is a new RED algorithm that includes per-packet adjustments to a modified RED algorithm, so that packets with different traffic classes are treated differently within a queue. It would be advantageous to include guaranteed and dynamic resource allocation for certain traffic classes.

SUMMARY OF THE INVENTION

A technique for random early drop (RED) with per-hop-behavior (PHB) biasing involves breaking RED parameters into queue-specific parameters and packet-specific parameters. The queue-specific and packet-specific parameters are then both used in RED procedures, thereby providing a PHB bias. The technique is compatible with assured forwarding (AF) PHB classes of traffic.

In an embodiment, a method of performing RED includes receiving a packet with an associated traffic class, making a class-specific RED adjustment for the packet, and managing the packet in accordance with RED parameters and the class-specific RED adjustment.

In another embodiment, a method of performing RED with PHB biasing includes associating queue-based parameters with a queue, associating PHB parameters with a packet according to a traffic class associated with the packet, establishing a queue size threshold using the queue-based parameters and the PHB parameters, and executing RED procedures on the packet in accordance with the queue size threshold.

In another embodiment, a method of performing RED includes detecting when memory resources have dropped below a memory resource threshold, modifying absolute resource maximum settings of a queue using the memory resource threshold, and executing RED procedures on a packet using the absolute resource maximum settings.

In another embodiment, a system for performing RED with PHB biasing includes a queue configured to receive packets and a RED block associated with the queue. Packets have an associated traffic class. The RED block includes a memory and a processor configured to execute procedures stored in the memory. The memory includes queue-based parameters associated with the queue, PHB parameters associated with the traffic class of a packet, and RED procedures that use the queue-based parameters and the PHB parameters.

Using the above-described techniques, RED is accomplished with PHB bias. In an alternative embodiment, memory resources are guaranteed. In yet another embodiment, memory resources are dynamically allocated. Thus, in an embodiment, a new RED implementation includes PHB biasing as well as guaranteed and dynamically allocated memory resources.

Exemplary figures illustrate embodiments of the invention that provide PHB bias to RED. Other aspects and advantages of the present invention will become apparent from the following detailed description, taken in conjunction with the accompanying drawings, illustrating by way of example the principles of the invention.

DETAILED DESCRIPTION OF THE INVENTION

As shown in the drawings for the purposes of illustration, an embodiment of the invention is a random early drop (RED) system configured for use in a network with packet-based traffic. The RED system may be incorporated into a packet-forwarding system, such as a system 200 illustrated in FIG. 2. The system 200 includes a packet-processor module 230 that receives packets from a media module 240 for forwarding to a switching fabric 250. The packet-processor module 230 includes an interface 232 through which the packets are received from the media module 240, an ingress 234 on which packets are enqueued while awaiting forwarding to the switching fabric 250, and an egress 236 for receiving packets that have been forwarded by, e.g., another packet-processor module (not illustrated) through the switching fabric 250. The ingress 234 typically includes a plurality of queues. Each queue may be associated with a RED block configured to apply RED procedures to an incoming traffic flow using a set of queue-based parameters associated with the queue and a set of per-hop-behavior (PHB) parameters associated with the flow. The RED block utilizes the set of queue-based parameters to determine absolute maximums and the set of PHB parameters to select percentages of those maximums as values. This allows biasing of the RED procedures for different flows or levels of service (LOS) within the same queue while maintaining maximum resource limits for the queue in its combined entirety.

Figure 2:
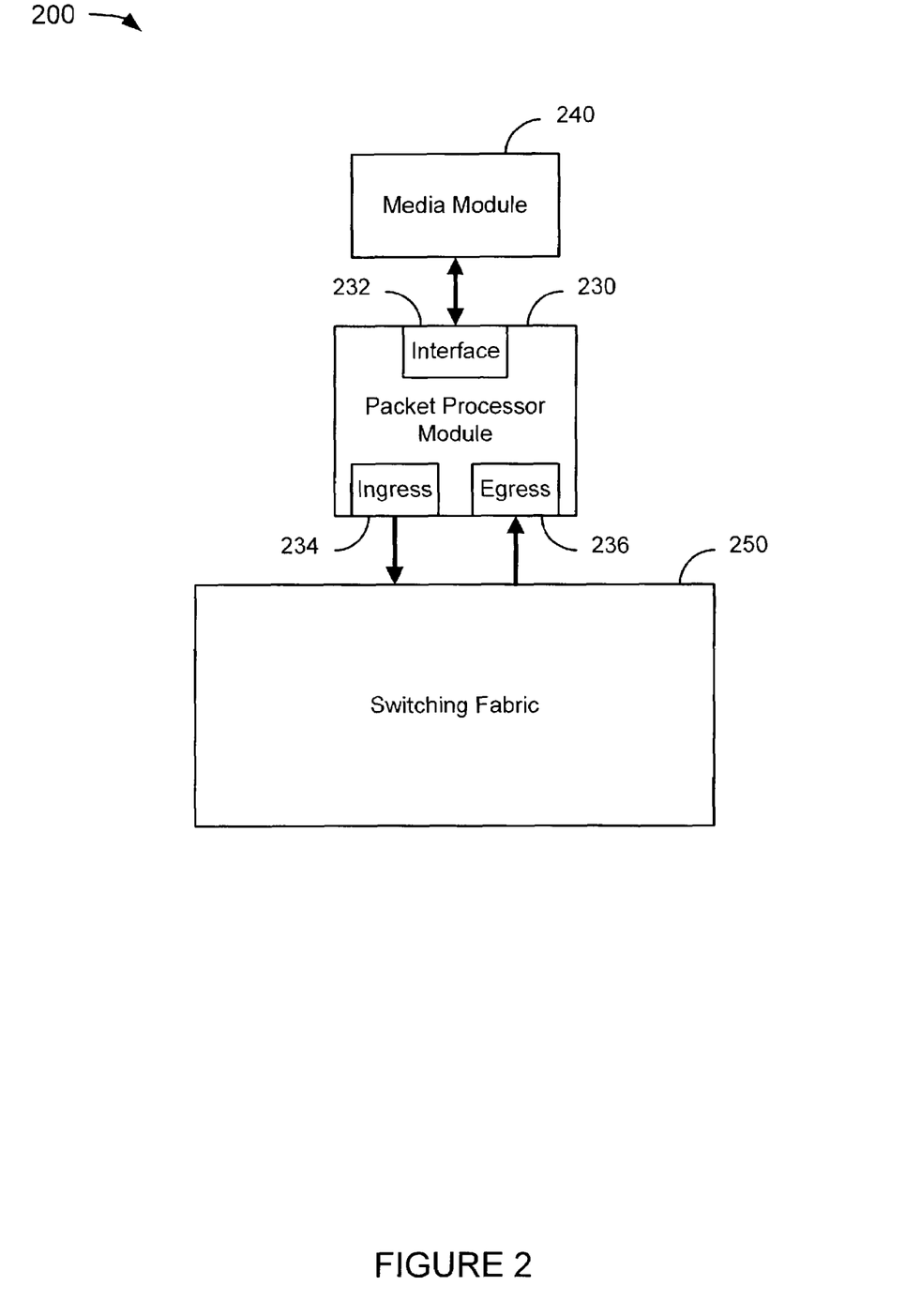
FIG. 2 is a block diagram of an exemplary packet-forwarding system in accordance with an embodiment of the invention.
Figure 3:
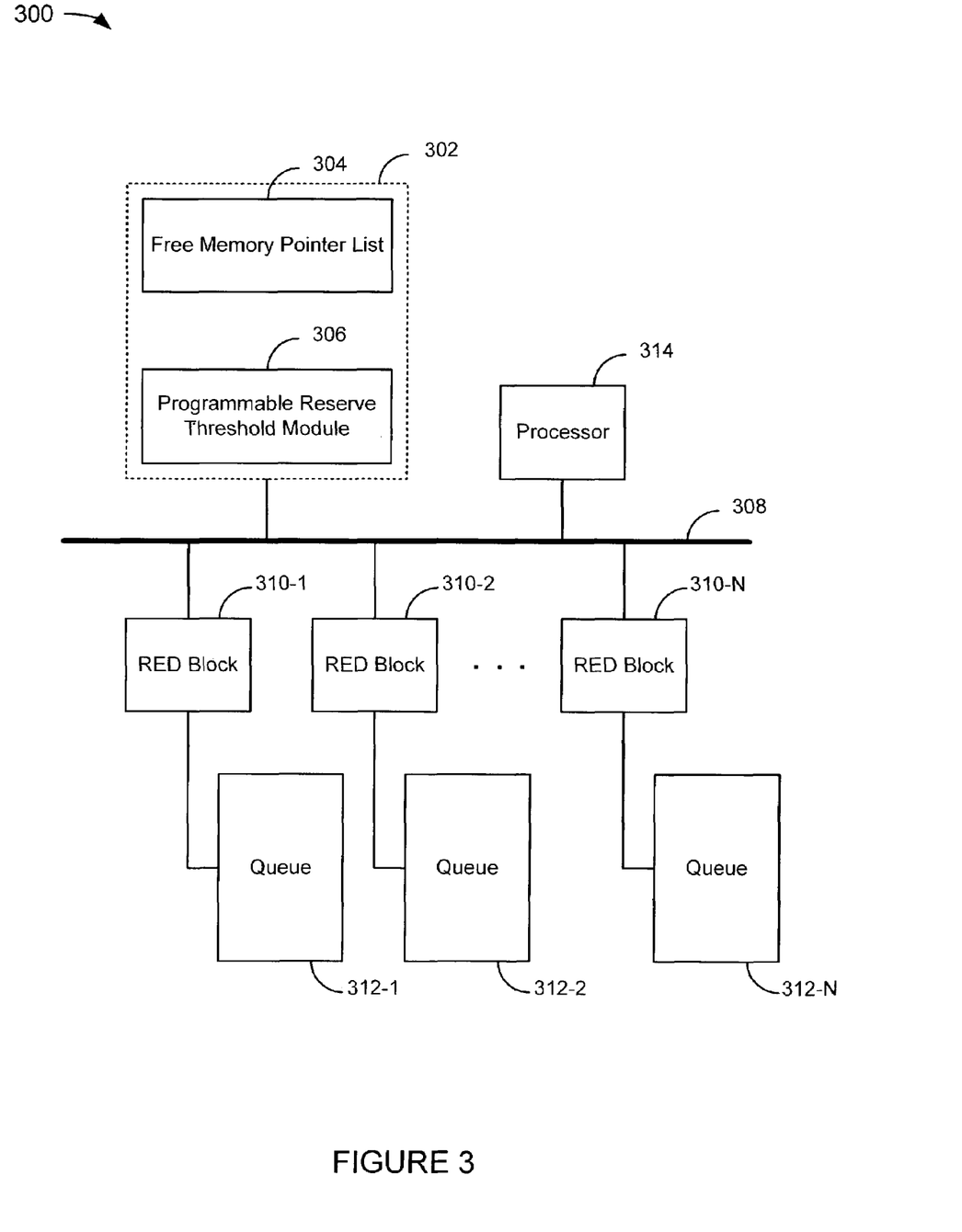
FIG. 3 is a block diagram of an exemplary subsystem in accordance with an embodiment of the invention, for use in the system of FIG. 2.

FIG. 3 is a block diagram of an exemplary subsystem 300 in accordance with an embodiment of the invention, for use in the system 200 of FIG. 2. The subsystem 300, which may be at least partially implemented in the ingress 234 (FIG. 2), includes a free memory pointer list block 302, a plurality of RED blocks 310-1 to 310-N, a plurality of queues 312-1 to 312-N respectively associated with the plurality of RED blocks 310-1 to 310-N, a processor 314 for executing procedures, and a bus 308 coupling the components. The free memory pointer list block 302 includes a free memory pointer list 304 and a programmable reserve threshold module 306. The free memory pointer list 304 is a list of pointers to available memory resources. The programmable reserve threshold module 306 is configured to detect when the total available memory resources (that is, those memory resources that are not in use by any of the packet queues) have dropped below a programmed reserve threshold. A RED block 310 includes modes to modify and adapt the settings of absolute resource maximums for an associated queue 312. Based on programming and available resources or when memory resources have dropped below a programmed reserve threshold, the associated queue 312 ignores absolute maximum settings, maintains absolute maximum settings, or doubles absolute maximum settings. Thus, for some queues (likely high priority queues), resources can be guaranteed (i.e., not change when total available resources fall below the programmed reserve threshold), while other queues (likely lower priority queues) can be permitted to oversubscribe when the available resources are above the programmed reserve threshold but clipped when available resources are waning.

Figure 4:
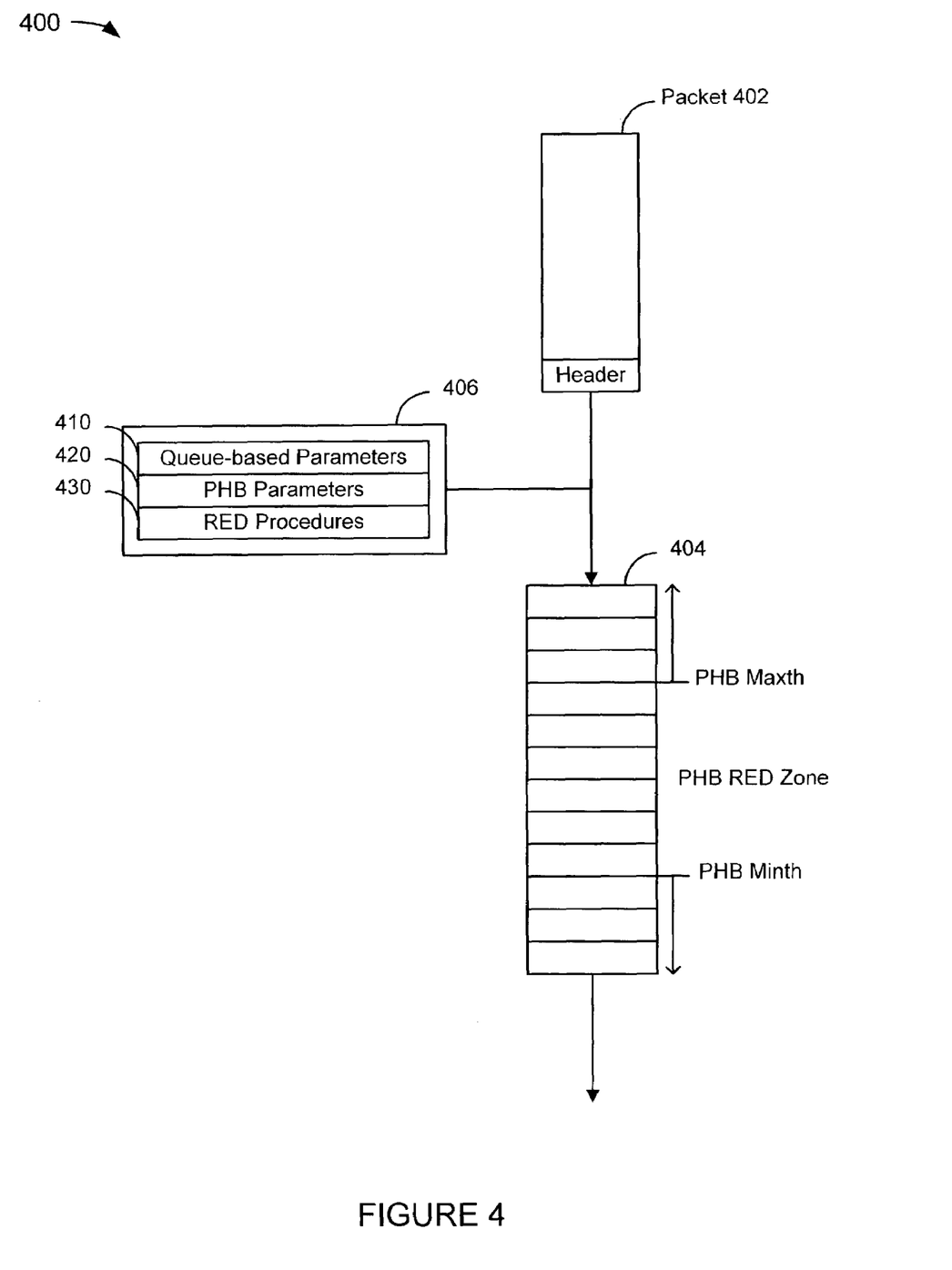
FIG. 4 is a block diagram of a queue and associated RED block in accordance with an embodiment of the invention, for use in the system of FIG. 2.

FIG. 4 is a block diagram of a queue 404 and associated RED block 406 in accordance with an embodiment of the invention. The queue 404 is configured to receive a packet 402. The packet 402 has an associated traffic class. The RED block 406 includes queue-based parameters 410, PHB parameters 420, and RED procedures 430. The RED procedures 430 use the queue-based parameters 410 and the PHB parameters 420 to implement RED with PHB biasing. The queue-based parameters 410 are associated with the queue 404. In an embodiment, the queue-based parameters are selected using a queue identifier (QID) that is associated with the queue 404. In another embodiment, the PHB parameters 420 are selected based upon the traffic class of the packet 402.

Figure 5A:
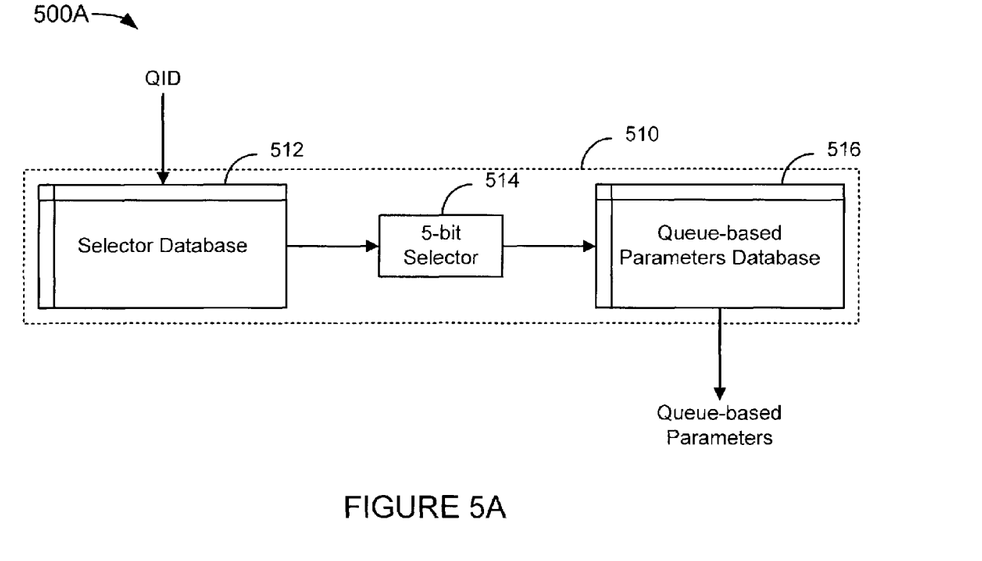
FIGS. 5A and 5B are block diagrams of parameter selectors in accordance with an embodiment of the invention, for use in the system of FIG. 2.
Figure 5B:
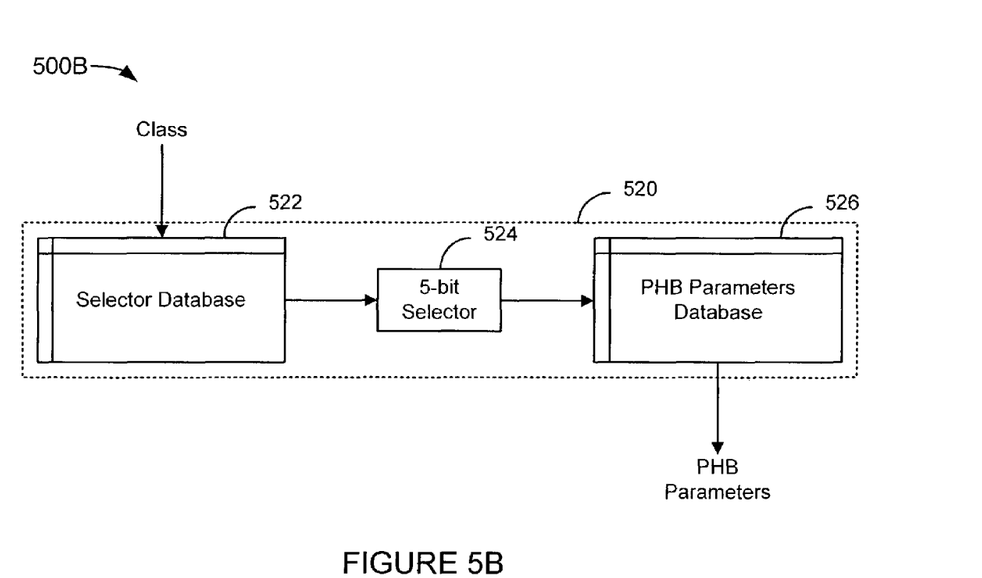

FIGS. 5A and 5B are block diagrams of parameter selectors in accordance with an embodiment of the invention, for use in the system of FIG. 2. For a system 500A, a queue-based parameter selection system 510 includes a selector database 512, a 5-bit selector field 514, and a queue-based parameters database 516. The selector database 512 includes a database entry for each QID and a selector field associated with each QID. The selector fields need not be unique. In an embodiment, there are 768 QIDs. As illustrated, for an input QID, a 5-bit selector field 514 is determined and used to look up queue-based parameters in the queue-based parameters database 516. Since the selector field is 5 bits long in this example, the queue-based parameters database 516 may contain 32 selectable database entries. The 5-bit selector field 514 is used to select a set of queue-based parameters for output from the queue-based parameter selection system 510 for use by the RED procedures 430 (FIG. 4). Exemplary queue-based parameters are discussed with reference to FIG. 6.

For a system 500B, a PHB parameter selection system 520 includes a selector database 522, a 5-bit selector 524, and a PHB parameters database 526. Though similar to the system 500A, one of several differences is that the selector database 522 contains as many database entries as traffic classes. In an embodiment, the system 500B supports eight bits of PHB, or up to 256 traffic classes. The traffic classes may be divided into, for example, eight priorities, four general use AF classes, and eight levels of service (LOS), which yields 256 traffic classes. However, the number of traffic classes is expected to vary depending upon implementation or evolving standards. Accordingly, the PHB parameters are programmable. Each traffic class has an associated selector in the selector database 522. As illustrated, for an input class, a 5-bit selector 524 is determined and used to look up PHB parameters in the PHB parameters database 526. Since the selector is 5 bits long in this example, the PHB parameters database 526 may contain 32 selectable database entries. A set of PHB parameters is selected using the 5-bit selector 524 and output from the PHB parameter selection system 520 for use by the RED procedures 430 (FIG. 4). Exemplary PHB parameters are discussed with reference to FIG. 6.

Figure 6A:
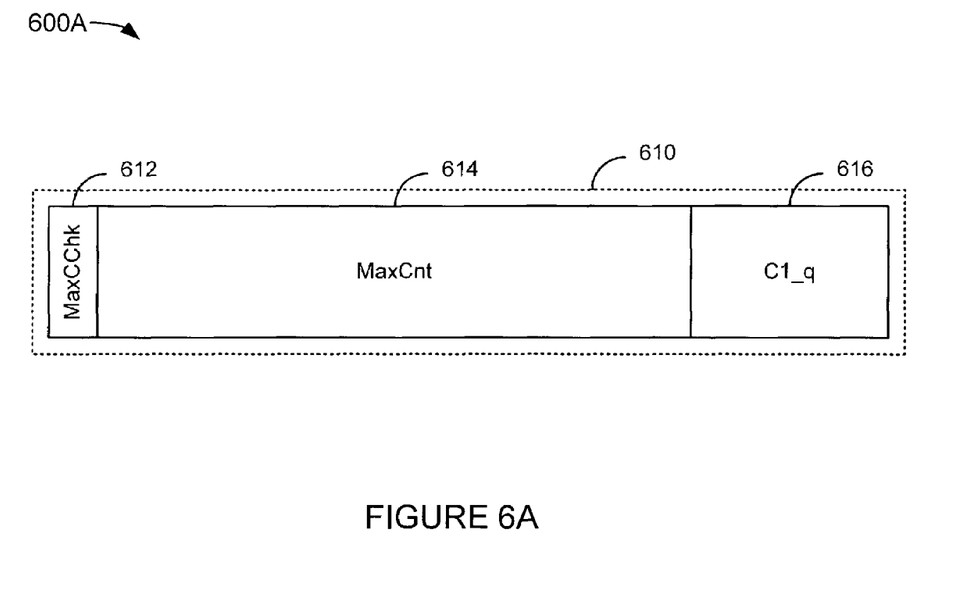
FIGS. 6A and 6B are block diagrams of RED parameters in accordance with an embodiment of the invention, for use in the system of FIG. 2.

FIG. 6A is a block diagram 600A of a data structure 610 that includes queue-based parameter fields in accordance with an embodiment of the invention. The data structure 610 includes a 2-bit long absolute maximum count check mode field (MaxCChk) 612, a 24-bit maximum allowed queue count field (MaxCnt) 614, and a 5-bit Cl_q field 616. In an embodiment, when MaxCChk 612 is set to '00', absolute maximum count check is disabled in a first mode; when set to '01' the absolute maximum count check is enabled in a second mode; when set to '10' the absolute maximum count check is disabled if available free list pointer count has not dropped below programmed reserve threshold and enabled otherwise in a third mode; and when set to '11' the absolute maximum count check is at ×2 the maximum count if available free list pointer count has not dropped below programmed reserve threshold and at ×1 otherwise in a fourth mode. In the first mode, the queue is treated by the RED procedures as if it had no size limit. The first mode is similar to a "pure RED" implementation because typical RED algorithms do not have a maximum count. In the second mode, the queue is treated by the RED procedures as if it has a size limit equal to MaxCnt 614. The second mode provides better control over the absolute queue size than a "pure RED" implementation, since the absolute (e.g., actual) queue size is considered in this RED implementation. In either mode, memory resources can be guaranteed for a queue with which the data structure 610 is associated. Accordingly, either mode is preferred for high priority queues. The third mode essentially switches between the first and second modes depending upon the availability of memory resources. The third mode provides for better control over the absolute queue size (i.e., similar to the second mode) when memory resources are relatively low and "pure RED" (i.e., similar to the first mode) otherwise. In the fourth mode, absolute queue size limits are always enforced, but when memory resources are plentiful, absolute queue size limits are relaxed (e.g., doubled) to allow greater traffic flexibility. MaxCnt 614 has a value indicative of the maximum number of cells that may be enqueued. In an embodiment, cells have fixed lengths. Thus, MaxCnt 614 is indicative of the maximum memory resources that may be allocated to the queue with which the data structure 610 is associated. It should be noted that if MaxCnt 614 has a value indicative of the maximum number of variable-length packets, then the relationship between MaxCnt 614 and memory would be inconsistent in the face of variable packet sizes. To determine Cl_q 616, 1/MaxCnt 614 is calculated by software and expressed as a negative power of 2 (i.e., 1/MaxCnt=$2^{-Cl\_q}$) Cl_q 616 is calculated and stored as a parameter in order to speed up later processes.

Figure 6B:
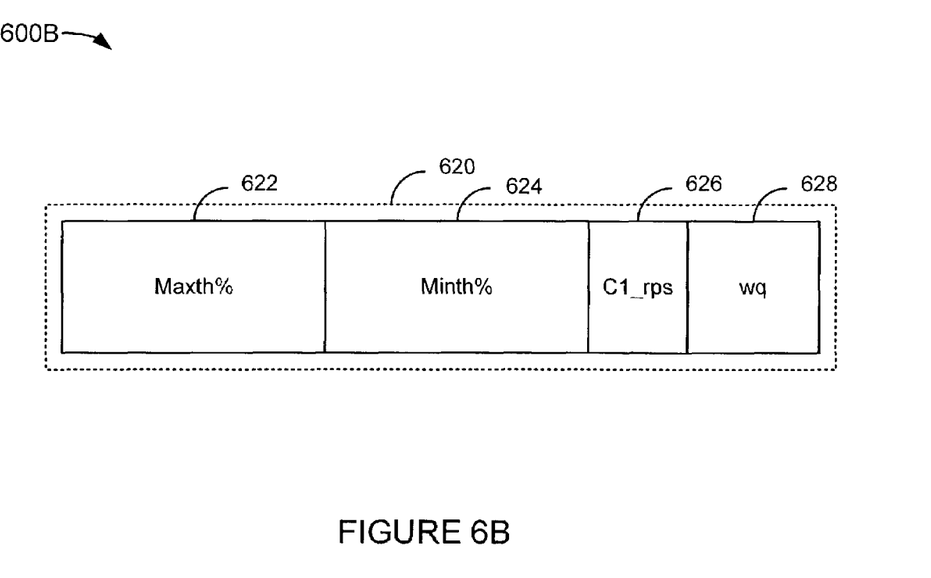

FIG. 6B is a block diagram 600B of a data structure 620 that includes PHB parameter fields in accordance with an embodiment of the invention. The data structure 620 includes a 7-bit maximum queue threshold percentage field (Maxth %) 622, a 7-bit minimum queue threshold percentage field (Minth %) 624, a 3-bit Cl_rps field 626, and a 4-bit queue weighting value field (wq) 628. Maxth % 622 is used to represent a value from 0 to 32. Normally this would require 5 bits, but, as an alternative, 7 bits are used to facilitate implementation by using fewer gate levels and providing better timing, as shown in Table 1: Maximum Queue Size Threshold as a Percentage of MaxCnt. The value of Maxth % 622 is determined by adding "offset 1" and "offset 2" to "base" if "sign" is '1' and subtracting "offset 1" and "offset 2" from "base" if "sign " is '0', where the values of "base", "offset 1", and "offset 2" are as indicated in Table 2: Values of Queue Size Threshold Base and Offset Bit Fields. Minth % 624 is used to represent a value from 0 to 32 in a manner similar to that of Maxth %. To determine Cl_rps 626, MaxP/(Maxth %−Minth %) is calculated by software and expressed as a negative power of 2 (i.e., MaxP/(Maxth %−Minth %)=$2^{-Cl\_rps}$). Like Cl_1 616, Cl_rps 626 is calculated and stored as a parameter in order to speed up later processes. wq 628 is a queue weighting expressed as a negative power of 2 ranging from 0 to 15. The value of wq 628 is indicative of the weight attributed to a packet for the purposes of calculating average queue size in accordance with RED procedures.

The queue-based parameters of data structure 610 (FIG. 6A) and the PHB parameters of data structure 620 (FIG. 6B) are used together in RED procedures as described with reference to FIG. 7. The average queue size is calculated using the PHB parameter wq 628 and a queue-based value, actual queue size, in accordance with a first RED algorithm to yield an average queue size for a period of time. The average queue size is used in a second RED algorithm that implements a formula (3) to determine a marking (or drop) probability. Formula (3) is:

$$P=(avg-(Minth\ \%*MaxCnt))*2^{-Cl\_rps}*2^{-Cl\_q}*2^{R}*2^{Count} \quad (3)$$

where:

avg, Minth %, MaxCnt, Cl_Irps, and Cl_q have been previously defined,

R=relative packet size (e.g., packet size/maximum packet size) approximated to a power of 2 as shown in Table 3: Relative Packet Size Approximations, and Count=accepted cells since last drop approximated as a power of 2 as shown in Table 4: Count Approximations.

TABLE 1

Maximum Queue Size Threshold as a Percentage of MaxCnt

| Percentage of MaxCnt | Sign* | Base | Offset 1 | Offset 2 |
|---|---|---|---|---|
| 0/32 = 0% | X | 00 | 00 | 00 |
| 1/32 = 3% | 1 | 00 | 00 | 01 |
| 2/32 = 6% | 1 | 00 | 00 | 10 |
| 3/32 = 9% | 1 | 00 | 01 | 01 |
| 4/32 = 13% | 1 | 00 | 10 | 00 |
| 5/32 = 16% | 1 | 00 | 10 | 01 |
| 6/32 = 19% | 1 | 00 | 10 | 10 |
| 7/32 = 22% | 0 | 01 | 00 | 01 |
| 8/32 = 25% | X | 01 | 00 | 00 |
| 9/32 = 28% | 1 | 01 | 00 | 01 |
| 10/32 = 31% | 1 | 01 | 00 | 10 |
| 11/32 = 34% | 1 | 01 | 01 | 01 |
| 12/32 = 38% | 1 | 01 | 10 | 00 |
| 13/32 = 41% | 1 | 01 | 10 | 01 |
| 14/32 = 44% | 1 | 01 | 10 | 10 |
| 15/32 = 47% | 0 | 10 | 00 | 01 |
| 16/32 = 50% | X | 10 | 00 | 00 |
| 17/32 = 53% | 1 | 10 | 00 | 01 |
| 18/32 = 56% | 1 | 10 | 00 | 10 |
| 19/32 = 59% | 1 | 10 | 01 | 01 |
| 20/32 = 63% | 1 | 10 | 10 | 00 |
| 21/32 = 66% | 1 | 10 | 10 | 01 |
| 22/32 = 69% | 1 | 10 | 10 | 10 |
| 23/32 = 72% | 0 | 11 | 11 | 01 |
| 24/32 = 75% | 0 | 11 | 11 | 00 |
| 25/32 = 78% | 1 | 10 | 11 | 01 |
| 26/32 = 81% | 0 | 11 | 10 | 10 |
| 27/32 = 84% | 0 | 11 | 10 | 01 |
| 28/32 = 88% | 0 | 11 | 10 | 00 |
| 29/32 = 91% | 0 | 11 | 01 | 01 |
| 30/32 = 94% | 0 | 11 | 00 | 10 |
| 31/32 = 97% | 0 | 11 | 00 | 01 |
| 32/32 = 100% | X | 11 | 00 | 00 |

*For this exemplary table, an 'X' indicates a "don't care" value.

TABLE 2

Values of Queue Size Threshold Base and Offset Bit Fields

| Bit Field | Bit Value: 00 | 01 | 10 | 11 |
|---|---|---|---|---|
| Base | 0/32 | 8/32 | 16/32 | 32/32 |
| Offset 1 | 0/32 | 2/32 | 4/32 | 8/32 |
| Offset 2 | 0/32 | 1/32 | 2/32 | 2/32 |

TABLE 3

Relative Packet Size Approximations

| Size of Packet in Cells* | Approximated Relative Size |
|---|---|
| 1 | −9 |
| 2-3 | −8 |
| 4-7 | −7 |
| 8-15 | −6 |
| 16-31 | −5 |
| 32-63 | −4 |
| 64-127 | −3 |
| 128-255 | −2 |
| 256-511 | −1 |
| 512+ | 0 |

*For this exemplary table, the maximum packet size is 528.

TABLE 4

Count Approximations

| Number of Cells Received | Approximate Count |
|---|---|
| 1 | 0 |
| 2-3 | 1 |
| 4-7 | 2 |
| 8-15 | 3 |
| 16-31 | 4 |
| 32-63 | 5 |
| 64-127 | 6 |
| 128-255 | 7 |
| 256-511 | 8 |
| 512-1023 | 9 |
| 1024-2047 | 10 |
| 2048-4095 | 11 |
| 4096-8191 | 12 |
| 8192-16383 | 13 |
| 16384-32767 | 14 |
| 32768-65635 | 15 |
| 65536-131071 | 16 |
| 131072-262143 | 17 |
| 262144-524287 | 18 |
| 524288-1048575 | 19 |
| 1048576-2097151 | 20 |
| 2097152-4194303 | 21 |
| 4194304+ | 22 |

That the formula (3) conforms to a RED algorithm is illustrated with the following observations using prior art formulae 2a, 2b, and 2c, which are described in the background and restated here for convenience:

$$A=maxp(avg-minth)/(maxth-minth) \quad (2a)$$

$$B=A(Packet\ Size/Max\ Packet\ Size) \quad (2b)$$

$$Probability\ of\ Drop=B/(1-(Count*B)) \quad (2c)$$

Since maxth (no PHB bias) is equivalent to MaxCnt*Maxth % (PHB bias) and minth (no PHB bias) is equivalent to MaxCnt*Minth % (PHB bias), formula (2a) can be rewritten as formula (4a).

$$A = (avg - MaxCnt * Minth\ \%) \quad (4a)$$
$$(MaxP/(Maxth\ \% - Minth\ \%))(1/MaxCnt)$$
$$= (avg - MaxCnt * Minth\ \%)(2^{-Cl\_rps})(2^{-Cl\_q})$$

Formula (2b) can be rewritten as formula (4b).

$$B=A*Relative\ Size=(A)(2^R)=(avg-MaxCnt*Minth\ \%)(2^{-Cl\_rps})(2^{-Cl\_q})(2^R)$$

Since formula (2c) can be approximated to B times the number of cells received since the last drop, formula (2c) can be rewritten as formula (3), above.

Using formula (3) a packet is marked for RED in three cases shown in formulae (5a), (5b), and (5c).

Queue Size>MaxCnt (5a)

Average Queue Size>MacCnt*Maxth % (5b)

(Average Queue Size>MaxCnt*Mintho) AND (P>Rnd) (5c)

where:
Rnd=a random number.

A marked packet is dropped in accordance with a RED system with a PHB bias.

Figure 7:
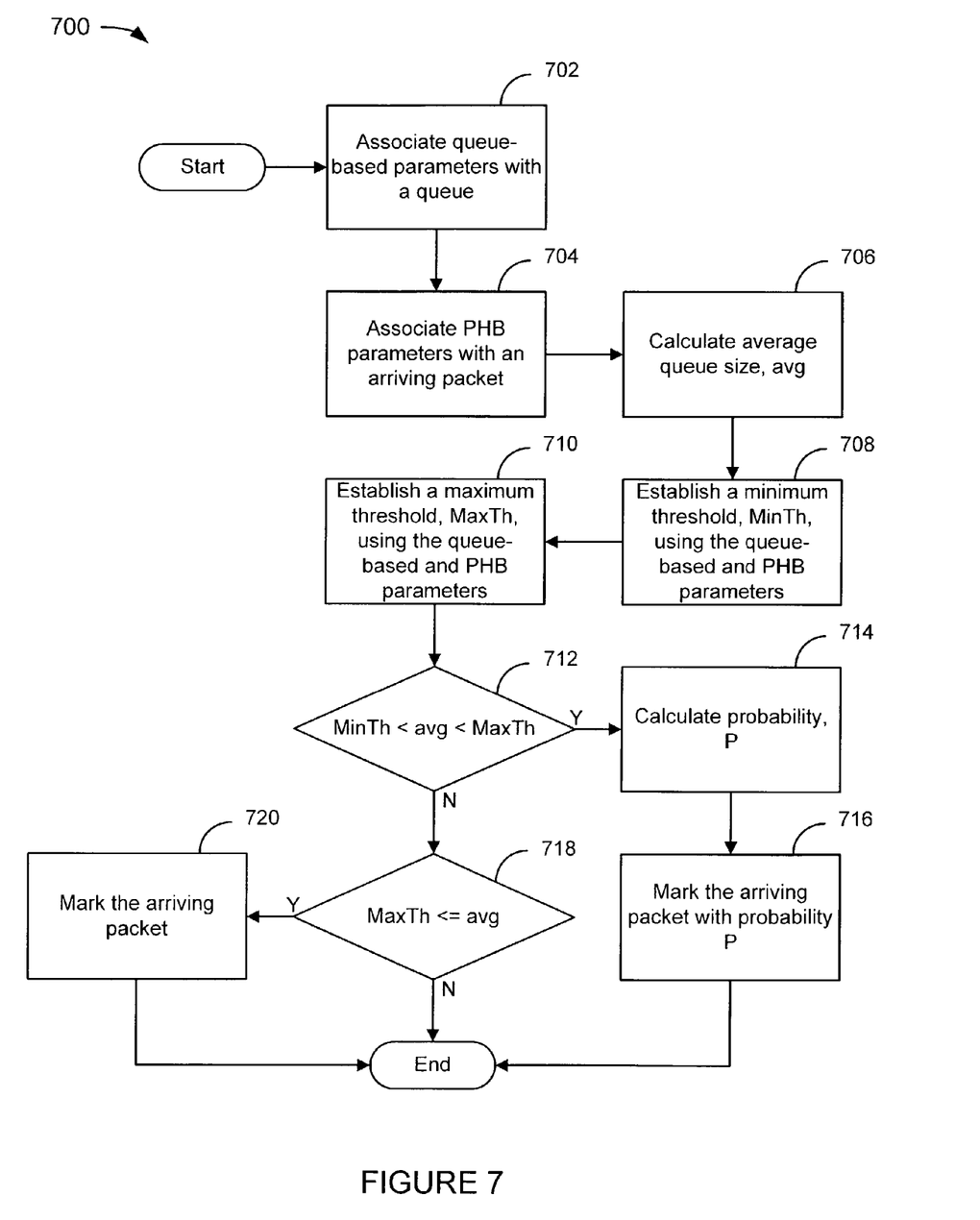
FIG. 7 is a flow chart of a method in accordance with an embodiment of the invention.

FIG. 7 is a flow chart 700 of a method in accordance with an embodiment of the invention. The flow chart 700 starts with associating queue-based parameters with a queue at step 702. In an embodiment, this is accomplished by selecting queue-based parameters using the QID for the queue. In an alternative, this is accomplished by using the QID to identify a selector for selecting queue-based parameters. PHB parameters are associated with an arriving packet at step 704. In an embodiment, this is accomplished by using a traffic class associated with the packet to select the PHB parameters. In an alternative, this is accomplished by using the traffic class of the packet to identify a selector for selecting PHB parameters. Average queue size, avg, is calculated at step 706. A minimum queue size threshold, MinTh, is established using the queue-based parameters and PHB parameters at step 708. The PHB parameters serve to provide a PHB bias to the calculation of MinTh. In other words, the minimum queue size threshold may fluctuate depending upon the PHB parameters. A maximum queue size threshold, MaxTh, is established using the queue-based parameters and PHB parameters at step 710. The PHB parameters serve to provide a PHB bias to the calculation of MaxTh. It is determined whether MinTh<avg<MaxTh at decision point 712. If MinTh<avg<MaxTh, then a probability, P, is calculated at step 714 and the arriving packet is marked with probability P at step 716 and the flowchart 700 ends. If avg is not between MinTh and MaxTh (712-N), then it is determined whether MaxTh<=avg at decision point 718. If MaxTh<=avg, then the arriving packet is marked at step 720 and the flowchart 700 ends. Otherwise, the arriving packet is not marked and the flowchart 700 ends.

In one embodiment, the method steps described above are embodied in a computer-readable media as computer instruction code. It shall be appreciated that not all methods steps described must be performed, nor must they be performed in the order stated.

The term packet is defined broadly to include fixed-length cells, variable length packets, and encapsulated data. A packet could be broken into a plurality of smaller cells. As used herein, the term packet could refer to a flow of the plurality of cells or a single cell of such a flow.

Although specific embodiments of the invention have been described and illustrated, the invention is not to be limited to the specific forms or arrangements of parts as described and illustrated herein. The invention is limited only by the claims.

What is claimed is:

1. A method of performing random early drop (RED), comprising:
   receiving a packet with an associated traffic class;
   making a class-specific RED adjustment for said packet to bias RED procedures for different traffic classes within a single queue; and
   managing said packet in accordance with RED parameters and said class-specific RED adjustment.

2. The method of claim 1, further comprising:
   associating queue-based parameters with a queue;
   associating PHB parameters with said packet according to said traffic class; and
   making said class-specific RED adjustment in accordance with said queue-based parameters and said PHB parameters.

3. The method of claim 2, further comprising:
   establishing a queue size threshold using said class-specific RED adjustment; and
   executing said RED procedures on said packet in accordance with said queue size threshold.

4. The method of claim 3, wherein said queue size threshold is a minimum threshold, further comprising:
   establishing a maximum threshold using said class-specific RED adjustment. wherein said executing further comprises executing said RED procedures on said packet in accordance with said maximum threshold;
   determining a packet marking probability from said class-specific RED adjustment;
   marking said packet if said packet is above said maximum threshold; and
   marking said packet if said packet is between said minimum threshold and said maximum threshold in accordance with said packet marking probability.

5. The method of claim 4, further comprising: determining a maximum allowed queue count for said queue from said queue-based parameters;
   determining a minimum threshold percentage and a maximum threshold percentage from said PHB parameters;
   calculating said minimum threshold from said minimum threshold percentage and said maximum allowed queue count; and
   calculating said maximum threshold from said maximum threshold percentage and said maximum allowed queue count.

6. The method of claim 5, further comprising: discarding said packet if said packet is marked.

7. The method of claim 1, further comprising:
   determining a queue weight from said PHB parameters;
   calculating an average queue size using said queue weight; and
   using said average queue size in accordance with said RED procedures.

8. The method of claim 2, where said queue-based parameters include an absolute maximum count check mode indicator, further comprising:
   establishing a count check mode for said queue;
   detecting when memory resources have dropped below a memory resource threshold;
   modifying absolute resource maximum settings of a queue in accordance with said count check mode and said detecting; and
   executing said RED procedures on a packet using said absolute resource maximum settings.

9. The method of claim 8, wherein said modifying includes a modification selected from the group consisting of ignoring absolute resource maximum settings, maintaining absolute resource maximum settings, and increasing absolute resource maximum settings.

10. A method of performing random early drop (RED) with per-hop-behavior (PHB) biasing, comprising:

associating queue-based parameters with a queue;

associating PHB parameters with a packet according to a traffic class associated with said packet;

establishing a queue size threshold using said queue-based parametric and said PHB parameters; and executing RED procedures on said packet in accordance with said queue size threshold, said RED procedures biased for different traffic classes within a single queue.

11. The method of claim 10, wherein said queue size threshold is a minimum threshold, further comprising:

establishing a maximum threshold using said queue-based parameters and said PHB parameters, wherein said executing further comprises executing said RED procedures on said packet in accordance with said maximum threshold;

determining a packet marking probability from said PHB parameters;

marking said packet if said packet is above said maximum threshold; and marking said packet if said packet is between said minimum threshold and said maximum threshold in accordance with said packet marking probability.

12. The method of claim 11, further comprising: determining a maximum allowed queue count for said queue from said queue-based parameters;

determining a minimum threshold percentage and a maximum threshold percentage from said PHB parameters;

calculating said minimum threshold from said minimum threshold percentage and said maximum allowed queue count; and calculating said maximum threshold from said maximum threshold percentage and said maximum allowed queue count.

13. The method of claim 11, further comprising: dropping said packet if said packet is marked.

14. The method of claim 10, further comprising:

determining a queue weight from said PHB parameters;

calculating an average queue size using said queue weight; and using said average queue size in accordance with said RED procedures.

15. A method of performing random early drop (RED), comprising:

detecting when memory resources have dropped below a memory resource threshold;

modifying absolute resource maximum settings of a queue in accordance with said detecting; and executing RED procedures on a packet using said absolute resource maximum settings.

16. The method of claim 15, wherein said modifying includes a modification selected from the group consisting of ignoring absolute resource maximum settings, maintaining absolute resource maximum settings, and increasing absolute resource maximum settings.

17. A system for performing random early drop (RED) with per-hop-behavior (PHB) biasing, comprising;

a queue configured to receive packets with a plurality of associated traffic classes, wherein a packet of said packets has an associated traffic class; and a RED block associated with said queue, said RED block including:

memory, configured to store:

queue-based parameters associated with said queue;

PHB parameters associated with said traffic class; and

RED procedures; and a processor configured to execute said RED procedures on said packet using said queue-based parameters and said PHB parameters.

18. The system of claim 17, further comprising:

a queue-based parameter selector for selecting said queue-based parameters using a queue identifier (QID) of said queue; and a PHB parameter selector for selecting said PHB parameters using said traffic class.

19. The system of claim 18, wherein said queue-based parameters include a maximum allowed queue count and said PHB parameters include a maximum threshold percentage and a minimum threshold percentage.

20. The system of claim 17, further comprising:

a free memory pointer block configured to detect when total available memory resources are below a reserve threshold, wherein said queue-based parameters include an absolute maximum count check mode selected from the modes consisting of disabling an absolute maximum count check, enabling said absolute maximum count check, disabling said absolute maximum count check if total memory resources are not below said reserve threshold and enabling said absolute maximum count check otherwise, and setting said absolute maximum count check to higher than a maximum count check if total memory resources are not below said reserve threshold and setting said absolute maximum count check to said maximum count check otherwise.

* * * * *